US012240735B2

(12) United States Patent
Hayashi

(10) Patent No.: US 12,240,735 B2
(45) Date of Patent: Mar. 4, 2025

(54) REMOTE OPERATION TERMINAL AND MOBILE CRANE PROVIDED WITH REMOTE OPERATION TERMINAL

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 523 days.

(21) Appl. No.: 17/607,584

(22) PCT Filed: May 22, 2020

(86) PCT No.: PCT/JP2020/020338
§ 371 (c)(1),
(2) Date: Oct. 29, 2021

(87) PCT Pub. No.: WO2020/235679
PCT Pub. Date: Nov. 26, 2020

(65) Prior Publication Data

US 2022/0219949 A1 Jul. 14, 2022

(30) Foreign Application Priority Data

May 22, 2019 (JP) ................................ 2019-096382

(51) Int. Cl.
*B66C 13/46* (2006.01)
*B66C 13/22* (2006.01)
*B66C 13/40* (2006.01)

(52) U.S. Cl.
CPC .............. *B66C 13/46* (2013.01); *B66C 13/22* (2013.01); *B66C 13/40* (2013.01); *B66C 2700/0371* (2013.01); *B66C 2700/088* (2013.01)

(58) Field of Classification Search
CPC ......... B66C 13/46; B66C 13/40; B66C 13/22; B66C 2700/0371; B66C 2700/088
See application file for complete search history.

(56) References Cited

U.S. PATENT DOCUMENTS

2014/0054254 A1* 2/2014 Ogawa .................. B66C 15/065 212/276
2019/0016569 A1* 1/2019 Palberg .................. B66C 13/46
(Continued)

FOREIGN PATENT DOCUMENTS

CN 108190749 A * 6/2018
JP 08322120 A * 12/1996
JP 2010-228905 A 10/2009

OTHER PUBLICATIONS

Machine translation of the description of CN 108190749 A, pp. 1-7 (Year: 2018).*
(Continued)

*Primary Examiner* — Anne Marie Antonucci
*Assistant Examiner* — Jared C Bean
(74) *Attorney, Agent, or Firm* — Paratus Law Group, PLLC

(57) ABSTRACT

A remote operation terminal of a crane provided with a GNSS receiver for calculating the current position of the tip of a boom: acquires attitude information of the crane and the current position of the tip of the boom from a control device of the crane; generates a three-dimensional image of the crane at the current time and planimetric features on the basis of the information acquired from the control device and three-dimensional information acquired by a three-dimensional information acquisition unit; displays, on a display device, the generated three-dimensional image at the position of and in the direction of a viewpoint input to a viewpoint changing operation tool; and generates a control signal for the crane so that the tip of the boom of the three-dimensional image moves in a moving direction input to a suspended load moving operation tool in the three-dimensional image of the crane displayed on the display device.

8 Claims, 9 Drawing Sheets

(A)

(B)

(56) References Cited

U.S. PATENT DOCUMENTS

| | | | | |
|---|---|---|---|---|
| 2019/0284027 | A1* | 9/2019 | Albrecht | B66C 13/46 |
| 2020/0391980 | A1* | 12/2020 | Hayashi | B66C 13/40 |

OTHER PUBLICATIONS

Machine Translation of description of JP-H08322120-A, Ogata et al. Dec. 3, 1996, pp. 1-7 (Year: 1996).*

Jul. 7, 2020, International Search Report issued for related PCT application No. PCT/JP2020/020338.

Jul. 7, 2020, International Search Opinion issued for related PCT application No. PCT/JP2020/020338.

* cited by examiner (A)

(B)

(A)

(B)

(A)

(B)

REMOTE OPERATION TERMINAL AND MOBILE CRANE PROVIDED WITH REMOTE OPERATION TERMINAL

CROSS REFERENCE TO PRIOR APPLICATION

This application is a National Stage Patent Application of PCT International Patent Application No. PCT/JP2020/020338 (filed on May 22, 2020) under 35 U.S.C. § 371, which claims priority to Japanese Patent Application No. 2019-096382 (filed on May 22, 2019), which are all hereby incorporated by reference in their entirety.

TECHNICAL FIELD

The present invention relates to a remote operation terminal and a mobile crane provided with the remote operation terminal.

BACKGROUND ART

Conventionally, regarding a mobile crane, a mobile crane in which an actuator of a crane device is remotely operated and a remote operation terminal that remotely operates the actuator of the crane device have been proposed. In the work using the remote operation terminal, the worker can perform the work while confirming the moving state of a load near the load or at the target position of the load away from the operation device of the crane device.

In such a mobile crane, the relative positional relationship between the crane device and the remote operation terminal changes according to the work situation. For this reason, the worker who operates the crane device with the remote operation terminal needs to operate the operation tool of the remote operation terminal while always considering the relative positional relationship with the work device. Hence, there is known a remote operation terminal capable of operating a crane device in an easy and simple manner by matching the operation direction of an operation tool of a remote operation terminal with the moving direction of the crane device, regardless of the relative positional relationship between the crane device and the remote operation terminal. Patent Literature 1 discloses one example.

A remote operation device (remote operation terminal) described in Patent Literature 1 is provided with a signal transmission unit that transmits a laser beam or the like having high straightness as a reference signal. Additionally, a control device on the crane (work device) side is provided with a reference signal receiving unit. The remote operation device is configured such that the reference coordinate system of an operation tool coincides with the transmission direction of the reference signal. The crane side control device specifies the direction of the remote operation device by receiving the reference signal from the remote operation device with the reception unit, and matches the coordinate system of the crane with the coordinate system of the remote operation device. As a result, since the operating direction of the operating tool of the remote operation device and the moving direction of the crane coincide with each other, operation of the crane by the remote operation device can be performed in an easy and simple manner regardless of the relative positional relationship between the crane and the remote operation device.

However, the mobile crane described in Patent Literature 1 receives the reference signal with the reception unit to specify the relative direction of the remote operation device with respect to the working machine, and matches the reference coordinate system of the operation tool and the coordinate system of the working machine. For this reason, in a site where the crane cannot be visually recognized from the remote operation device, a site where there are many obstacles, or the like, the reception unit cannot receive the reference signal, and the coordinate system of the mobile crane cannot be matched with the coordinate system of the remote operation device in some cases.

CITATION LIST

Patent Literature

Patent Literature 1: JP 2010-228905 A

SUMMARY OF THE INVENTION

Problems to be Solved by the Invention

An object of the present invention is to provide a remote operation terminal and a mobile crane including the remote operation terminal capable of preventing as erroneous operation at the time of remote operation of the mobile crane and performing the remote operation of the mobile crane in an easy and simple manner.

Solutions to Problems

The problem to be solved by the present invention is as described above, and means for solving the problem will be described below.

That is, a first aspect of the present invention is a remote operation terminal of a mobile crane including a position detection unit that detects a current position of a tip of a boom, the remote operation terminal including:

a three-dimensional information acquisition unit that acquires three-dimensional information of each of the mobile crane and a planimetric feature within a movable range of the mobile crane;

a display unit that displays, in a virtual space, a three-dimensional image of each of the mobile crane and the planimetric feature within the movable range of the mobile crane;

a crane operation unit that receives a crane operation done by an operator and remotely operates the mobile crane so as to correspond to the crane operation;

an image operation unit that receives an image display changing operation done by the operator and controls a viewpoint position and a viewpoint direction in the three-dimensional image displayed on the display unit so as to correspond to the image display changing operation; and a control unit that is configured to be communicable with a control device of the mobile crane and controls each unit of the remote operation terminal, in which the control unit acquires attitude information of the mobile crane, movable range information of the mobile crane, and current position information of the tip of the boom from the control device of the mobile crane, generates the three-dimensional image of the current mobile crane and the three-dimensional image of the planimetric feature within the movable range of the current mobile crane, on the basis of the information acquired from the control device of the mobile crane and the three-dimensional information acquired by the three-dimensional information acquisition unit, displays the generated three-dimensional image in the virtual space of the display unit at the viewpoint position and the viewpoint direction input to the image operation unit, and when the crane operation is input to the crane operation unit, associates a coordinate system of a horizontal plane of the three-dimensional image displayed on the display unit and an operation direction of the crane operation on the basis of the viewpoint position and the viewpoint direction, and generates a control signal for remotely operating the mobile crane so that the tip of the boom displayed on the display unit moves horizontally toward the operation direction of the crane operation.

According to a second aspect of the present invention, in the above remote operation terminal, the crane operation unit is configured to be capable of operating the three-dimensional image of the mobile crane displayed on the display unit, and the control unit generates a control signal for remotely operating the mobile crane on the basis of operation information of the three-dimensional image by the crane operation unit.

According to a third aspect of the present invention, in the above remote operation terminal, the control unit acquires an image captured by a suspended load camera included in the mobile crane, and causes the display unit to display the acquired image together with the three-dimensional image.

A fourth aspect of the present invention is a remote operation terminal of a mobile crane including a position detection unit that detects a current position of a tip of a boom, the remote operation terminal including:

an aerial camera that images the mobile crane and a planimetric feature within a movable range of the mobile crane;

an imaging information acquisition unit that acquires an image captured by the aerial camera, and position coordinates and a capturing direction of the aerial camera;

a display unit that displays the image;

a crane operation unit that receives a crane operation done by an operator and remotely operates the mobile crane so as to correspond to the crane operation; and a control unit that is configured to be communicable with a control device of the mobile crane and controls each unit of the remote operation terminal, in which the control unit acquires attitude information of the mobile crane and current position information of the tip of the boom of the mobile crane from the control device of the mobile crane, displays the image acquired by the imaging information acquisition unit on the display unit, and when the crane operation is input to the crane operation unit, associates a coordinate system of a horizontal plane of the image displayed on the display unit and an operation direction of the crane operation on the basis of the position coordinates and the imaging direction of the aerial camera, and generates a control signal for remotely operating the mobile crane so that the tip of the boom displayed on the display unit moves horizontally toward the operation direction of the crane operation.

A fifth aspect of the present invention is the above remote operation terminal further including an unmanned aerial vehicle having the aerial camera, and an aerial vehicle operation unit that operates the unmanned aerial vehicle, in which the imaging information acquisition unit acquires position coordinates of the unmanned aerial vehicle and a direction of the aerial camera as position coordinates and an imaging direction of the aerial camera, and the display unit displays the image captured by the aerial camera of the unmanned aerial vehicle operated by the aerial vehicle operation unit.

A sixth aspect of the present invention is a mobile crane including the above remote operation terminal, is which a boom is operated on the basis of the control signal received from the remote operation terminal.

Effects of the Invention

The present invention has the following effects.

In the first and sixth aspects of the present invention, the remote operation terminal generates the control signal so that the tip of the boom in the three-dimensional image of the mobile crane in the virtual space displayed in an arbitrary direction from an arbitrary viewpoint moves in the operation direction of the crane operation unit in the display state. Hence, the remote operation of the mobile crane is intuitively performed without being conscious of the positional relationship of the viewpoint with respect to the mobile crane. As a result, an erroneous operation at the time of remote operation of the mobile crane can be prevented, and the remote operation of the mobile crane can be performed in an easy and simple manner.

In the second aspect of the present invention, since the control signal of the mobile crane is generated on the basis of the movement of the mobile crane using the three-dimensional image in the virtual space, the mobile crane is operated in consideration of the surrounding situation and the operation condition. As a result, an erroneous operation at the time of remote operation of the mobile crane can be prevented, and the remote operation of the mobile crane can be performed in an easy and simple manner.

In the third aspect of the present invention, information such as a planimetric feature that is not reproduced in a three-dimensional image in the virtual space is displayed. As a result, an erroneous operation at the time of remote operation of the mobile crane can be prevented, and the remote operation of the mobile crane can be performed in an easy and simple manner.

In the fourth aspect of the present invention, the operation direction reference of the remote operation terminal is set so that the tip of the boom of the mobile crane, which is imaged in an arbitrary imaging direction from arbitrary camera coordinates, moves in the operation direction of the crane operation unit in the display state. Hence, the remote operation of the mobile crane can be performed intuitively without being conscious of the positional relationship of the viewpoint with respect to the mobile crane. As a result, an erroneous operation at the time of remote operation of the mobile crane can be prevented, and the remote operation of the mobile crane can be performed an easy and simple manner.

In the fifth and sixth aspects of the present invention, the remote operation terminal generates the control signal so that the tip of the boom of the mobile crane imaged in an arbitrary imaging direction from arbitrary camera coordinates moves in the operation direction of the crane operation unit in the display state. Hence, the remote operation of the mobile crane can be performed intuitively without being conscious of the positional relationship of the camera coordinates with respect to the mobile crane. As a result, an erroneous operation at the time of remote operation of the mobile crane can be prevented, and the remote operation of the mobile crane can be performed in an easy and simple manner.

BRIEF DESCRIPTION OF DRAWINGS

FIG. 5(A) illustrates a state in which a three-dimensional image viewed from the side of the crane is displayed on the remote operation terminal, and FIG. 5(B) illustrates a state in which a three-dimensional image viewed from the upper front side of the crane is displayed on the remote operation terminal.

FIG. 6(A) is an enlarged view of a three-dimensional image of the crane displayed on the remote operation terminal, and FIG. 6(B) illustrates a state in which a suspended load moving operation tool of the remote operation terminal is operated.

FIG. 10(A) illustrates an unmanned aerial vehicle controlled by the remote operation terminal, and FIG. 10(B) illustrates a control image captured by the unmanned aerial vehicle.

DESCRIPTION OF EMBODIMENTS

Hereinafter, a crane 1 which is a mobile crane according to a first embodiment of the present invention will be described with reference to FIGS. 1 and 2. Note that while a rough terrain crane will be described in the present embodiment, the crane may be an all-terrain crane, a truck crane, a truck loader crane, or the like.

Figure 1:
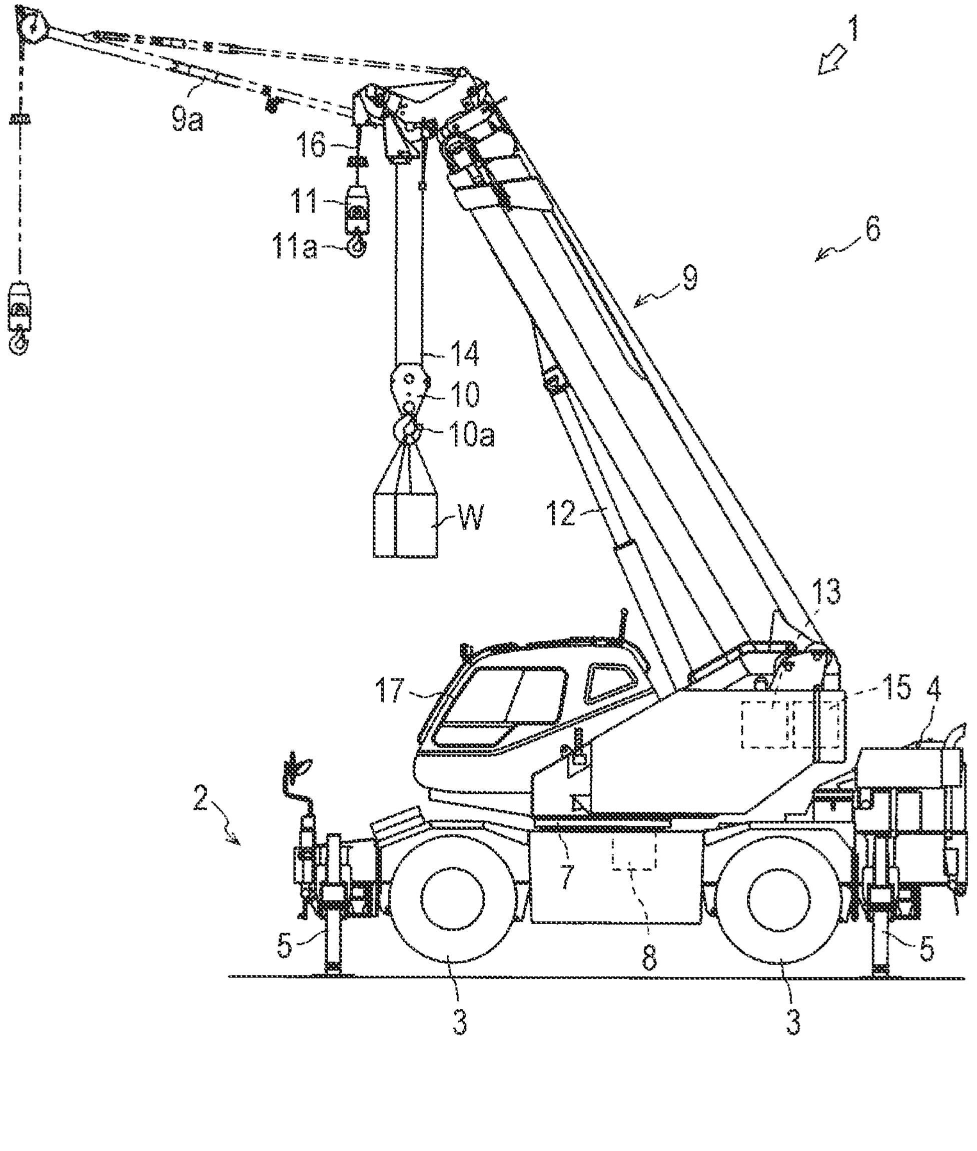
FIG. 1 is a side view illustrating an overall configuration of a crane.

As illustrated in FIG. 1, the crane 1 is a mobile crane that can be moved to an unspecified place. The crane 1 includes a vehicle 2, a crane device 6 as a work device, a control device 31, and a remote operation terminal 32 (see FIG. 2) capable of remotely operating the crane device 6.

The vehicle 2 is a mobile body that transports the crane device 6. The vehicle 2 has a plurality of wheels 3 and travels using an engine 4 as a power source. The vehicle 2 is provided with an outrigger 5. The outrigger 5 includes an overhanging beam that can be extended by hydraulic pressure on both sides in the width direction of the vehicle 2, and a hydraulic jack cylinder that can be extended in a direction perpendicular to the ground. The vehicle 2 can expand the workable range of the crane 1 by extending the outrigger 5 in the width direction of the vehicle 2 and grounding the jack cylinder.

The crane device 6 is a device that lifts a load W with a wire rope. The crane device 6 includes a slewing base 7, a boom 9, a jib 9*a*, a main hook block 10, a sub hook block 11, a hydraulic derricking cylinder 12, a main winch 13, a main wire rope 14, a sub winch 15, a sub wire rope 16, a cabin 17, and the like.

The slewing base 7 is a device that slews the crane device 6. The slewing base 7 is rotatable about the center of an annular bearing. The slewing base 7 is provided with a hydraulic slewing motor 8 that is an actuator. The slewing base 7 is slewable in one and the other direction by the hydraulic stewing motor 8.

The hydraulic slewing motor 8, which is an actuator, is rotationally operated by a slewing valve 23 (see FIG. 2), which is an electromagnetic proportional switching valve. The slewing valve 23 can control the flow rate of hydraulic oil supplied to the hydraulic stewing motor 8 to an arbitrary flow rate. The slewing base 7 is provided with a slewing sensor 27 (see FIG. 2) that detects a slewing position (angle) and a slewing speed of the stewing base 7.

The boom 9 is a beam member that supports the wire rope in a state where the wire rope can lift the load W. The base end of a base boom member of the boom 9 is swing ably provided substantially at the center of the stewing base 7. The boom 9 is capable of expanding and contracting in the axial direction by moving each boom member with a hydraulic expansion/contraction cylinder (not illustrated) which is an actuator. Additionally, the boom 9 is provided with the jib 9*a*.

The hydraulic expansion/contraction cylinder (not illustrated) which is an actuator is expanded and contracted by an expansion/contraction valve 24 (see FIG. 2) which is an electromagnetic proportional switching valve. The boom 9 is provided with an expansion/contraction sensor 28 that detects the length of the boom 9, a weight sensor that detects the weight of the load W, and the like.

A suspended load camera 9*b* (see FIG. 2) is an imaging device that images the load W and planimetric features around the load W. The suspended load camera 9*b* is provided in a tip part of the boom 9. The suspended load camera 9*b* is capable of imaging the load W and planimetric features and topography around the crane 1 from vertically above the load W.

The main hook block 10 and the sub hook block 11 are members for suspending the load W. The main hook block 10 is provided with a plurality of hook sheaves around which the main wire rope 14 is wound, and a main hook 10*a* for suspending the load W. The sub hook block 11 is provided with a sub hook 11*a* for suspending the load W.

The hydraulic derricking cylinder 12 is an actuator that raises and lowers the boom 9 and holds the attitude of the boom 9. The hydraulic derricking cylinder 12 is operated to expand and contract by a derricking valve 25 (see FIG. 2) which is an electromagnetic proportional switching valve. The boom 9 is provided with a derricking sensor 29 (see FIG. 2) that detects a derricking angle of the boom 9.

The main winch 13 and the sub winch 15 spool (wind up) and feed (wind out) the main wire rope 14 and the sub wire rope 16. The main winch 13 is configured such that a main drum around which the main wire rope 14 is wound is rotated by a main hydraulic motor (not illustrated) as an actuator, and the sub winch 15 is configured such that a sub drum around which the sub wire rope 16 is wound is rotated by a sub hydraulic motor (not illustrated) as an actuator.

The main hydraulic motor is rotationally operated by a main valve 26*m* (see FIG. 2) which is an electromagnetic proportional switching valve. By controlling the main hydraulic motor with the main valve 26*m*, the main winch 13 can be operated at an arbitrary spooling and feeding speed. Similarly, by controlling the sub hydraulic motor with a sub valve 26*s* (see FIG. 2), which is an electromagnetic proportional switching valve, the sub winch 15 can be operated at an arbitrary spooling and feeding speed.

The cabin 17 is mounted on the slewing base 7. An unillustrated cockpit is provided. The cockpit is provided with an operation tool for operating traveling of the vehicle 2, a slewing operation tool 18 for operating the crane device 6, a derricking operation tool 19, an expansion/contraction operation tool 20, a main drum operation tool 21*m*, a sub drum operation tool 21*s*, and the like (see FIG. 2).

A communication device 22 (see FIG. 2) is a device that receives a control signal from the remote operation terminal 32 through a wide-area information communication network or the like, and transmits control information and the like from the crane device 6 through the wide-area information communication network or the like. The communication device 22 is provided in the cabin 17. The communication device 22 is configured to transfer a control signal or the like to the control device 31 of the crane 1, upon receipt of the control signal or the like from the remote operation terminal 32. Additionally, the communication device 22 is configured to transfer control information from the control device 31 and a suspended load image i1 from the suspended load camera 9*h* to the remote operation terminal 32.

The GNSS receiver 30 (see FIG. 2), which is a position detection unit, is a receiver included in a global navigation satellite system, and is a device that receives a ranging electric wave from a satellite and detects latitude, longitude, and altitude, which are position coordinates of the receiver. The GNSS receiver 30 is provided at the tip of the boom 9 and in the cabin 17 (hereinafter, GNSS receivers provided at tip of boom 9 and in cabin 17 are collectively referred to as "GNSS receiver 30"). That is, the crane 1 can acquire position coordinates of the tip of the boom 9 and position coordinates of the cabin 17 with the GNSS receiver 30. Additionally, the crane 1 can detect the arrangement of the boom 9 with respect to the tip (position of load W) of the boom 9 with the GNSS receiver 30. Note that while the crane 1 detects the tip position of the boom 9 using the GNSS receiver 30 in the following embodiment, the crane 1 may detect the tip position of the boom 9 using known position detection means such as a fired point camera or near field wireless communication.

Figure 2:
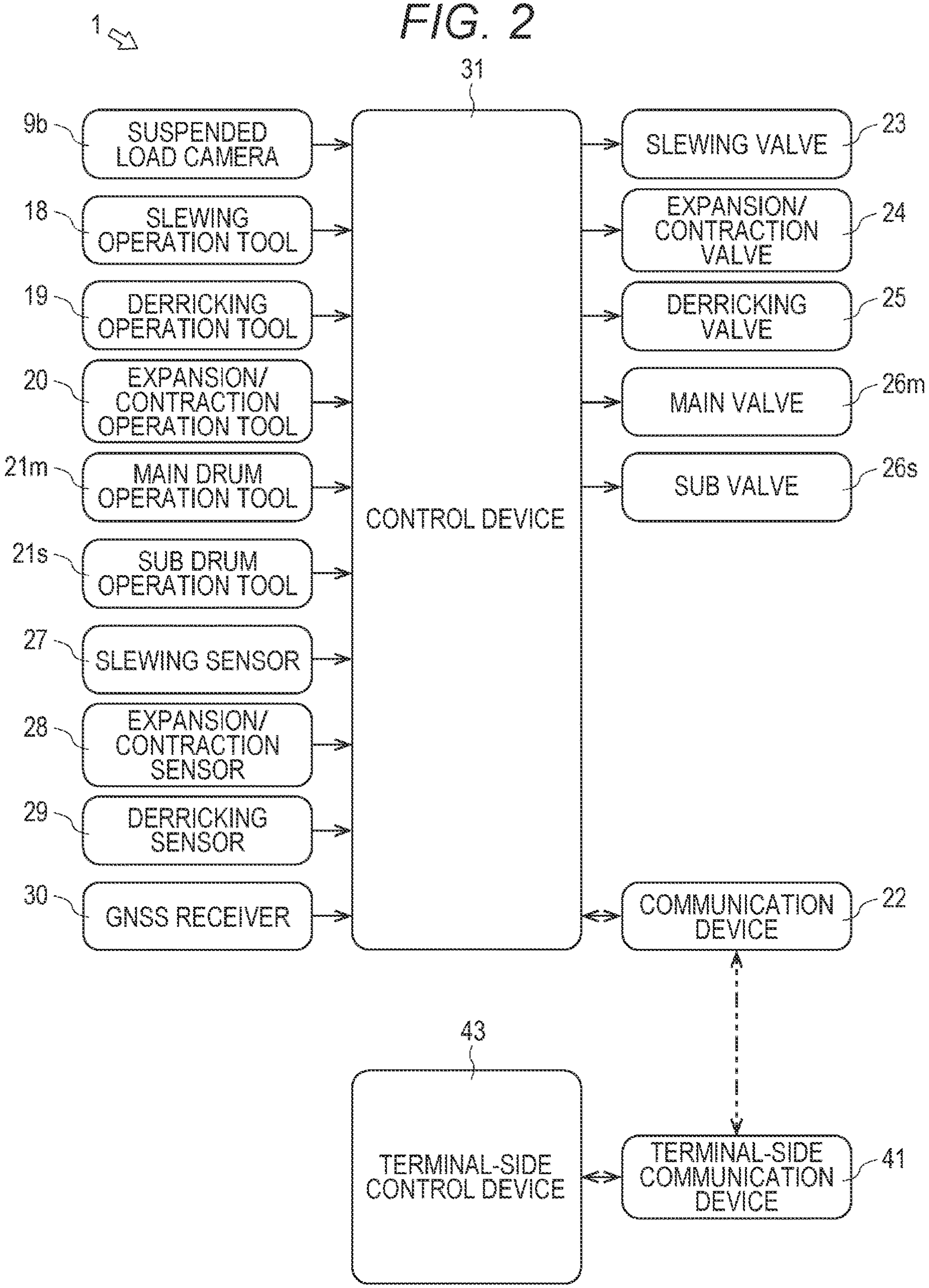
FIG. 2 is a block diagram illustrating a control configuration of a crane.

As illustrated in FIG. 2, the control device 31 is a device that controls an actuator of the crane 1 through each operation valve. The control device 31 is provided in the cabin 17. Substantially, the control device 31 may be configured such that a CPU, a ROM, a RAM, an HDD, and the like are connected by a bus, or may be configured of a one-chip LSI and the like. The control device 31 stores various programs and data in order to control the operation of each actuator, switching valve, sensor, and the like.

The control device 31 is connected to the suspended load camera 9*b*, the slowing operation tool 18, the derricking operation tool 19, the expansion/contraction operation tool 20, the main drum operation tool 21*m*, and the sub drum operation tool 21*s*, can acquire the suspended load image i1 of the suspended load camera 9*h*, and can acquire the operation amount of each of the stewing operation tool 18, the derricking operation tool 19, the main drum operation tool 21*m*, and the sub drum operation tool 21*s*.

The control device 31 is connected to the communication device 22, can acquire a control signal from the remote operation terminal 32, and can transmit control information from the crane device 6, the suspended load image i1 from the suspended load camera 9*b*, and the like.

The control device 31 is connected to the slewing valve 23, the expansion/contraction valve 24, the derricking valve 25, the main valve 26*m*, and the sub valve 26*s*, and can transmit a control signal to the slewing valve 23, the derricking valve 25, the main valve 26*m*, and the sub valve 26*s*.

The control device 31 is connected to the slewing sensor 27, the expansion/contraction sensor 28, and the derricking sensor 29, and can acquire attitude information such as the slewing position of the slewing base 7, the boom length, and the derricking angle, and the weight of the load W.

The control device 31 is connected to the GNSS receiver 30, and can acquire position coordinates of the tip of the boom 9 and position coordinates of the cabin 17. Additionally, the control device 31 can calculate the arrangement of the boom 9 with respect to the tip (load W) of the boom 9 from the acquired position coordinates of the tip of the boom 9 and position coordinates of the cabin 17.

The control device 31 generates a control signal corresponding to each operation tool on the basis of the operation amount of the slewing operation tool 18, the derricking operation tool 19, the main drum operation tool 21*m*, and the sub drum operation tool 21*s*.

The crane 1 configured as described above can move the crane device 6 to an arbitrary position by causing the vehicle 2 to travel. Additionally, the crane 1 can expand the lifting range and the work radius of the crane device 6 by causing the boom 9 to stand at an arbitrary derricking angle by operating the hydraulic derricking cylinder 12 with the derricking operation tool 19 and extending the boom 9 to an arbitrary boom length by operating the expansion/contraction operation tool 20. Additionally, the crane 1 can lift the load W by the sub drum operation tool 21*s* or the like, and can convey the load W by slewing the slewing base 7 by operating the slewing operation tool 18.

Next, the remote operation terminal 32 that remotely operates the crane 1 will be described with reference to FIGS. 3 to 5(B).

Figure 3:
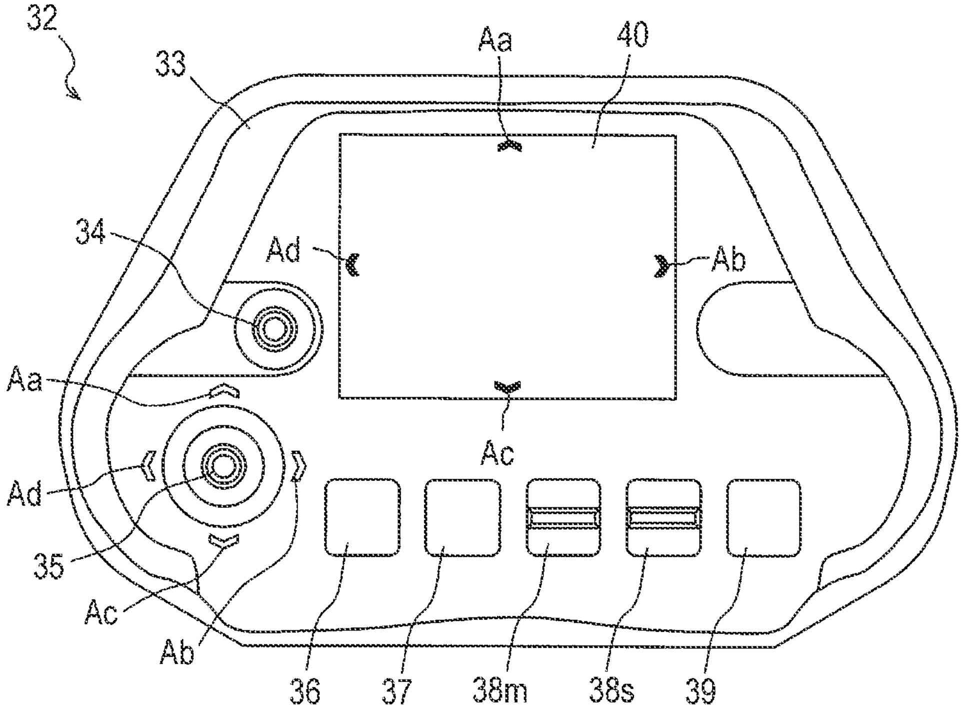
FIG. 3 is a plan view illustrating a schematic configuration of a first embodiment of a remote operation terminal.

As illustrated in FIG. 3, the remote operation terminal 32 is a device used for remotely operating the crane 1. The remote operation terminal 32 includes a housing 33, a viewpoint changing operation tool 34 which is an image operation unit provided on the operation surface of the housing 33, a suspended load moving operation tool 35 which is a crane operation unit provided on the operation surface of the housing 33, a terminal-side stewing operation tool 36, a terminal-side expansion/contraction operation tool 37, a terminal-side main drum operation tool 38*m*, a terminal-side sub drum operation tool 38*s*, a terminal-side derricking operation tool 39, a display device 40 which is a display unit, a terminal-side communication device 41, a terminal-side control device 43 (see FIG. 4), and the like. The remote operation terminal 32 transmits a control signal of an operation valve of each actuator for moving the load W by operating the suspended load moving operation tool 35 or various operation tools to the crane device 6 through a wide area information communication network (the Internet or the like).

The housing 33 is a main component of the remote operation terminal 32. The housing 33 is formed in a size that can be held by the operator's hand. The housing 33 is provided with the viewpoint changing operation tool 34, the suspended load moving operation tool 35, the terminal-side slewing operation tool 36, the terminal-side expansion/contraction operation tool 37, the terminal-side main drum operation tool 38*m*, the terminal-side sub drum operation tool 38*s*, the terminal-side derricking operation tool 39, the display device 40, and the terminal-side communication device 41 (see FIGS. 2 and 4) on the operation surface.

The viewpoint changing operation tool 34 is an operation tool that receives input of an instruction to change the position of the viewpoint and the direction of the viewpoint of a three-dimensional image G displayed on the display device 40. The viewpoint changing operation tool 34 includes a rotatable operation stick protruding from the operation surface of the housing 33, and a sensor (not illustrated) that detects a rotation direction and rotation amount, and a tilt direction and tilt amount of the operation stick. With art operation of the operation stick, the viewpoint changing operation tool 34 transmits, to the terminal-side control device 43, a signal regarding the position of the viewpoint and the direction of the viewpoint of the three-dimensional image G in the virtual space displayed on the display device 40. That is, with an operation of the operation stick, the viewpoint changing operation tool 34 transmits, to the terminal-side control device 43, an operation signal regarding the displacement amount of the three-dimensional image G in the virtual space displayed on the display device 40.

The suspended load moving operation tool 35, which is a first operation unit, is an operation tool that receives input of an instruction to move the load W at an arbitrary speed in an arbitrary direction on an arbitrary horizontal plane. The suspended load moving operation tool 35 includes an operation stick standing substantially vertically from the operation surface of the housing 33 and a sensor (not illustrated) that detects a tilt direction and a tilt amount of the operation stick. The suspended load moving operation tool 35 is configured such that the operation stick can be tilted in an arbitrary direction. The suspended load moving operation tool 35 is configured to transmit, to the terminal-side control device 43, a signal regarding the angle and the tilt amount between the upward direction of the remote operation terminal 32 and the tilt direction of the operation stick detected by the sensor. The remote operation terminal 32 displays, as indicators of the tilting operation of the suspended load moving operation tool 35, an arrow Aa indicating an upward direction at the time of facing the operation surface of the housing 33, an arrow Ab indicating a rightward direction at the time of facing the operation surface, an arrow Ac indicating a downward direction at the time of facing the operation surface, and an arrow Ad indicating a leftward direction at the time of facing the operation surface.

The terminal-side slewing operation tool 36 is an operation tool that receives input of an instruction to slew the crane device 6 at an arbitrary moving speed in an arbitrary moving direction. The terminal-side slewing operation tool 36 includes an operation stick standing substantially vertically from the operation surface of the housing 33 and a sensor (not illustrated) that detects a tilt direction and a tilt amount of the operation stick.

The terminal-side expansion/contraction operation tool 37 is an operation tool that receives input of an instruction to expand and contract the boom 9 at an arbitrary speed. The terminal-side expansion/contraction operation tool 37 includes an operation stick standing from the operation surface of the housing 33 and a sensor (not illustrated) that detects a tilt direction and a tilt amount of the operation stick.

The terminal-side main drum operation tool 38*m* is an operation tool that receives input of an instruction to rotate the main winch 13 at an arbitrary speed in an arbitrary direction. The terminal-side main drum operation tool 38*m* includes an operation stick standing from the operation surface of the housing 33 and a sensor (not illustrated) that detects a tilt direction and a tilt amount of the operation stick. The terminal-side sub drum operation tool 38*s* is similarly configured.

The terminal-side derricking operation tool 39 is an operation tool that receives input of an instruction to raise or lower the boom 9 at an arbitrary speed. The terminal-side derricking operation tool 39 includes an operation stick standing from the operation surface of the housing 33 and a sensor (not illustrated) that detects a tilt direction and a tilt amount of the operation stick.

The display device 40 is a display device 40 that displays various information such as attitude information of the crane 1 and information of the load W. The display device 40 includes an image display device such as a liquid crystal screen. The display device 40 is provided on the operation surface of the housing 33. The display device 40 displays the three-dimensional image G of the crane 1 arranged in the virtual space and the three-dimensional image G of a ground surface, planimetric features, and the like within the movable range of the crane 1 (hereinafter, both images are collectively referred to as "three-dimensional image G"). Note that while the display device 40 is provided in the remote operation terminal 32 in the present embodiment, the display device 40 may be a monitor separated from the remote operation terminal 32.

Moreover, the display device 40 displays, as indicators of the tilting direction of the suspended load moving operation tool 35, an arrow Aa in an upward direction at the time of facing the operation surface of the housing 33, an arrow Ab indicating a rightward direction at the time of facing the operation surface, an arrow Ac indicating a downward direction at the time of facing the operation surface, and an arrow Ad indicating a leftward direction at the time of facing the operation surface.

Figure 4:
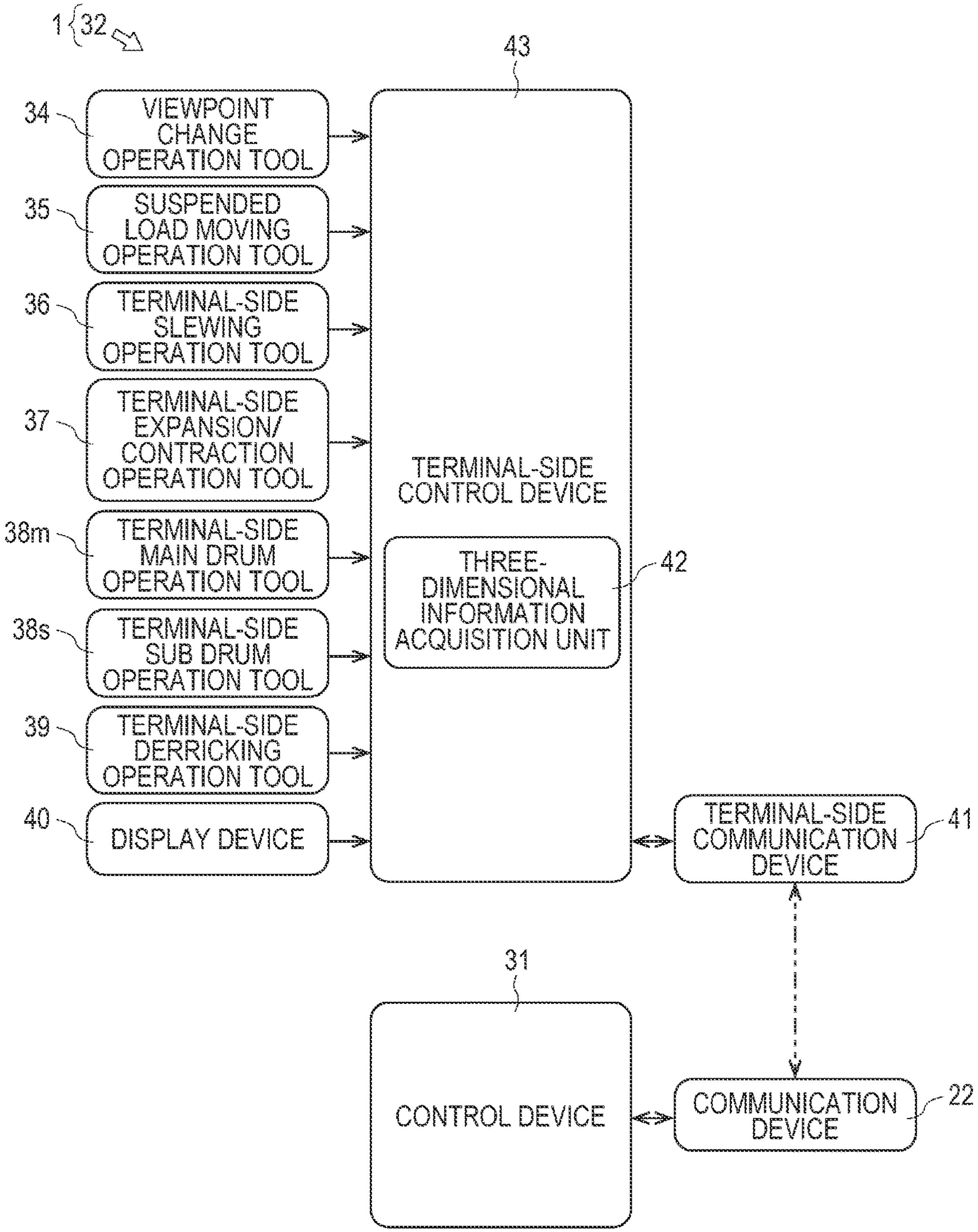
FIG. 4 is a block diagram illustrating a control configuration of the remote operation terminal.
Figure 5:
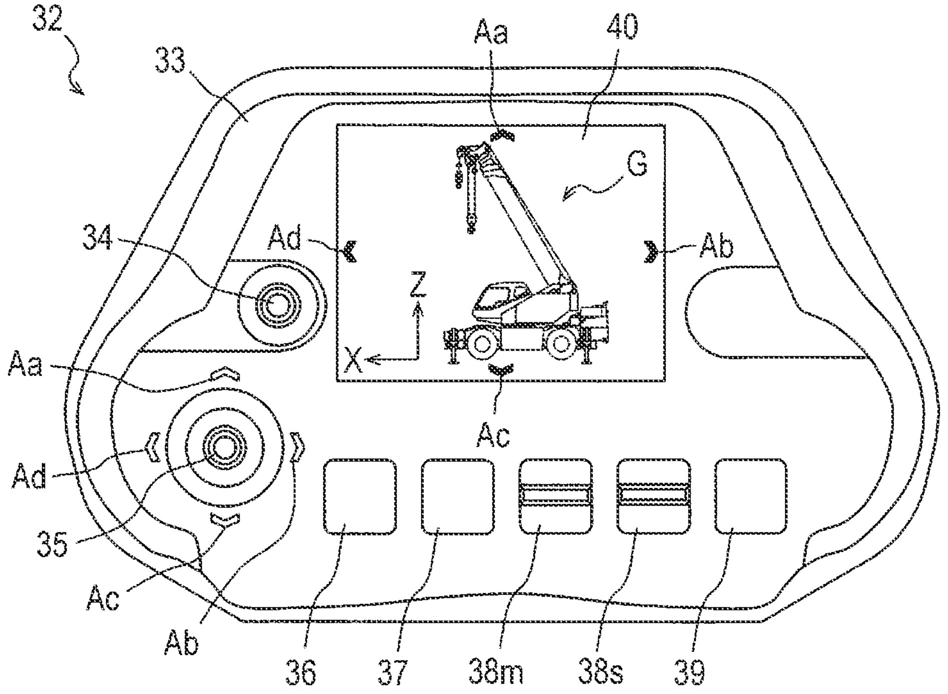
FIGS. 5(A) and 5(B) illustrate the first embodiment of the remote operation terminal.
Figure 5:
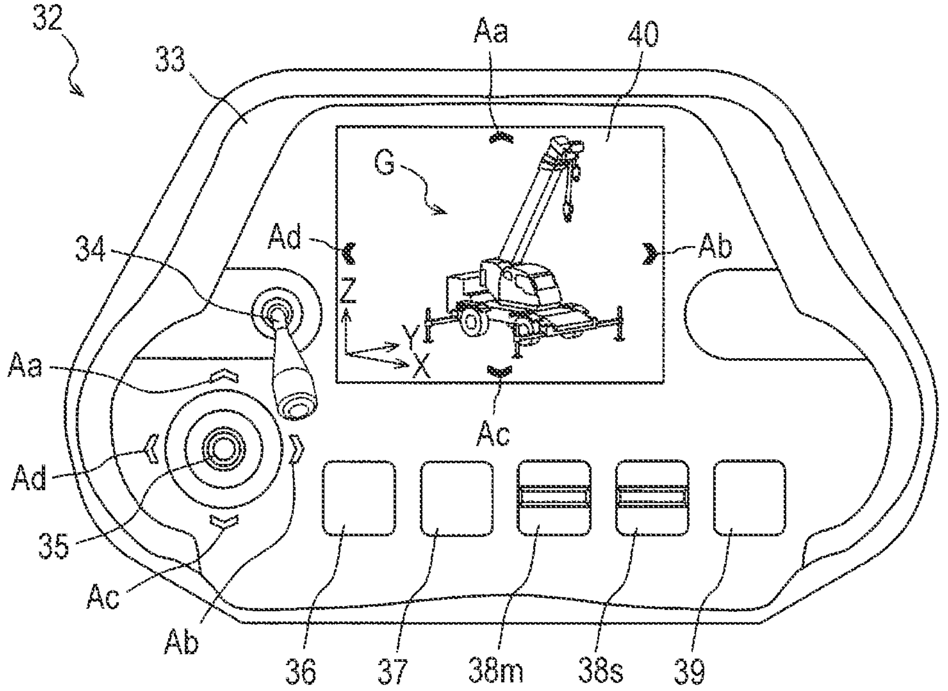

As illustrated in FIG. 4, the terminal-side communication device 41 is a device that receives control information and the like of the crane device 6 through a wide-area information communication network or the like, and transmits control information and the like from the remote operation terminal 32 to the crane device 6. The terminal-side communication device 41 is provided inside the housing 33. The terminal-side communication device 41 is configured to transmit the suspended load image i1 (see FIG. 7), the control signal, and the like to the terminal-side control device 43, upon receipt of the suspended load image i1, a control signal, and the like from the crane device 6. Additionally, the terminal-side communication device 41 is configured to transmit control information from the terminal-side control device 43, from the wide-area information communication network or the like to the crane device 6 through the communion device 22 of the crane 1.

The terminal-side control device 43 as a control unit is a device that controls the remote operation terminal 32. The terminal-side control device 43 is provided inside the housing 33 of the remote operation terminal 32. Substantially, the terminal-side control device 43 may be configured such that a CPU, a ROM, a PJM, an HDD, and the like are connected by a bus, or may be configured of a one-chip LSI and the like. The terminal-side control device 43 includes a three-dimensional information acquisition unit 42. The terminal-side control device 43 stores various programs and data in order to control operations of the suspended load moving operation tool 35, the viewpoint changing operation tool 34, the terminal-side slewing operation tool 36, the terminal-side expansion/contraction operation tool 37, the terminal-side main drum operation tool 38*m*, the terminal-side sub drum operation tool 38*s*, the terminal-side derricking operation tool 39, the display device 40, the terminal-side communication device 41, and the like.

The terminal-side control device 43 is connected to the suspended load moving operation tool 35, the terminal-side stewing operation tool 36, the terminal-side expansion/contraction operation tool 37, the terminal-side main drum operation tool 38*m*, the terminal-side sub drum operation tool 38*s*, and the terminal-side derricking operation tool 39, and can acquire an operation signal including a tilt direction and a tilt amount of the operation stick of each operation tool. Additionally, the terminal-side control device 43 is connected to the viewpoint changing operation tool 34, and can acquire an operation signal including the rotation direction and rotation amount, and the tilt direction and tilt amount input to the viewpoint changing operation tool 34.

The terminal-side control device 43 is connected to the terminal-side communication device 41, and can transmit and receive various types of information to and from the control device 31 through the communication device 22 of the crane device 6 connected through the wide-area information communication network. Specifically, the terminal-side control device 43 can acquire, from the control device 31, attitude information of the crane 1, the suspended load image i1 captured by the suspended load camera 9*b*, the movable range of the crane 1, and the current position of the tip of the boom 9.

The three-dimensional information acquisition unit 42 of the terminal-side control device 43 can acquire three-dimensional information of the crane 1 (e.g., information on three-dimensional shape of crane 1), three-dimensional information of a planimetric feature within a movable range of the crane 1 (e.g., information on three-dimensional shape of planimetric feature), and the like from the control device 31 of the crane 1 or a building information modeling (BIM) such as a management server (not illustrated) through the wide-area information communication network.

The terminal-side control device 43 can generate a control signal of a corresponding one of the slewing valve 23, the expansion/contraction valve 24, the derricking valve 25, the main valve 26*m*, and the sub valve 26*s* from the operation signal of each operation stick acquired from each sensor of the terminal-side slewing operation tool 36, the terminal-side expansion/contraction operation tool 37, the terminal-side main drum operation tool 38*m*, the terminal-side sub drum operation tool 38*s*, and the terminal-side derricking operation tool 39.

The terminal-side control device 43 can generate the three-dimensional image G of the crane 1 in the attitude of the current crane 1 and planimetric features within the movable range of the current crane 1, on the basis of the attitude information of the crane 1, the movable range of the crane 1 and current position of the tip of the boom 9, the three-dimensional information of the crane 1 and three-dimensional information of planimetric features within the movable range of the crane 1, and the like acquired from the control device 31 of the crane 1.

The terminal side control device 43 is connected to the display device 40, and can cause, the display device 40 to display the three-dimensional image G of the crane 1 in the attitude of the current crane 1 and the planimetric features within the movable range of the current crane 1, the suspended load image i1 from the suspended load camera 9*b*, and various types of information acquired from the crane 1. Additionally, the terminal-side control device 43 can display the three-dimensional image G displayed on the display device 40 as a three-dimensional image G from an arbitrary viewpoint position and viewpoint direction in synchronization with the rotation direction and rotation amount and the tilt direction and tilt amount input to the viewpoint changing operation tool 34.

The terminal-side control device 43 generates a control signal of the crane 1 when the suspended load moving operation tool 35 is tilted, with reference to a display state which is a position and an orientation on a screen of the three-dimensional image S of the crane 1 in the virtual space displayed on the display device 40. For example, when the suspended load moving operation tool 35 is tilted in the direction of the arrow Aa or the direction of the arrow Ac (hereinafter simply referred to as "vertical direction of remote operation terminal 32"), which is the vertical direction of the remote operation terminal 32, the terminal-side control device 43 generates a control signal of the crane 1 in which the tip of the boom 9 is moved horizontally as well as in the vertical direction at the time of facing the operation surface of the housing 33 in the virtual space. Additionally, when the suspended load moving operation tool 35 is tilted in the direction of the arrow Ab or the direction of the arrow Ad (hereinafter simply referred to as "left-right direction of remote operation terminal 32"), which is the left-right direction at the time of facing the operation surface of the housing 33, the terminal-side control device 43 generates a control signal of the crane 1 in which the tip of the boom 9 is moved horizontally and in the left-right direction at the time of facing the operation surface of the housing 33 in the virtual space. As described above, when the suspended load moving operation tool 35 is tilted in an arbitrary direction, the terminal-side control device 43 generates a control signal of the crane 1 in which the tip of the boom 9 is moved horizontally and in the tilting direction of the suspended load moving operation tool 35 in virtual space, in the display state of the three-dimensional image P of the crane 1 displayed in virtual space.

Moreover, the terminal-side control device 43 generates a control signal of the crane 1, and also moves the tip of the boom 9 in the three-dimensional image G of the crane 1 displayed on the display device 40 in the tilting direction of the suspended load moving operation tool 35. That is, the remote operation terminal 32 can confirm the operating state of the crane 1, in advance, by the movement of the three-dimensional image G of the crane 1 in the virtual space displayed on the display device 40. When a transmission operation is given or a predetermined condition (e.g., predetermined time elapses from generation of control signal) is satisfied for a generated control signal, the terminal-side control device 43 transmits the control signal to the control device 31 of the crane 1.

As illustrated in FIGS. 5(A) and 5(B), the terminal-side control device 43 (see FIG. 4) displays, on the display screen, the three-dimensional image G rotated and moved on the basis of an operation signal related to the rotation direction and rotation amount and the tilt direction and tilt amount acquired from the rotated and tilted viewpoint changing operation tool 34. In the present embodiment, a forward direction of the crane 1 is defined as an X-axis direction, a direction perpendicular to the forward direction of the crane 1 is defined as a Y direction, and the vertical direction of the crane 1, which is a direction perpendicular to the ground surface in the virtual space, is defined as a Z direction.

As illustrated in FIG. 5(A), the terminal-side control device 43 causes the display device 40 to display the three-dimensional image G in the virtual space on the basis of attitude information of the crane 1, the movable range of the crane 1, the current position of the tip of the boom 9 acquired from the control device 31 of the crane 1, and the three-dimensional information of the crane 1 and the three-dimensional information of planimetric features within the movable range of the crane 1, and the like acquired from the BIM. In the present embodiment, the display device 40 displays the three-dimensional image G of the crane 1 in which the direction of the line of sight is the direction along the Y-axis at the position of the viewpoint from the left side in the forward direction of the crane 1.

As illustrated in FIG. 5(B), when the viewpoint changing operation tool 34 is rotated and tilted, the terminal-side control device 43 rotates and moves the three-dimensional image G of the crane 1 displayed on the display device 40 on the basis of the rotation direction and rotation amount and the tilt direction and tilt amount of the viewpoint changing operation tool 34. When the viewpoint changing operation tool 34 is rotated counterclockwise and tilted downward with respect to the remote operation terminal 32, the terminal-side control device 43 rotates the three-dimensional image G of the crane 1 displayed on the display device 40 in the state of FIG. 5(A) counterclockwise about the Z-axis, and displays the state of FIG. 5(B) rotated counterclockwise about the X-axis on the display device 40.

Figure 6:
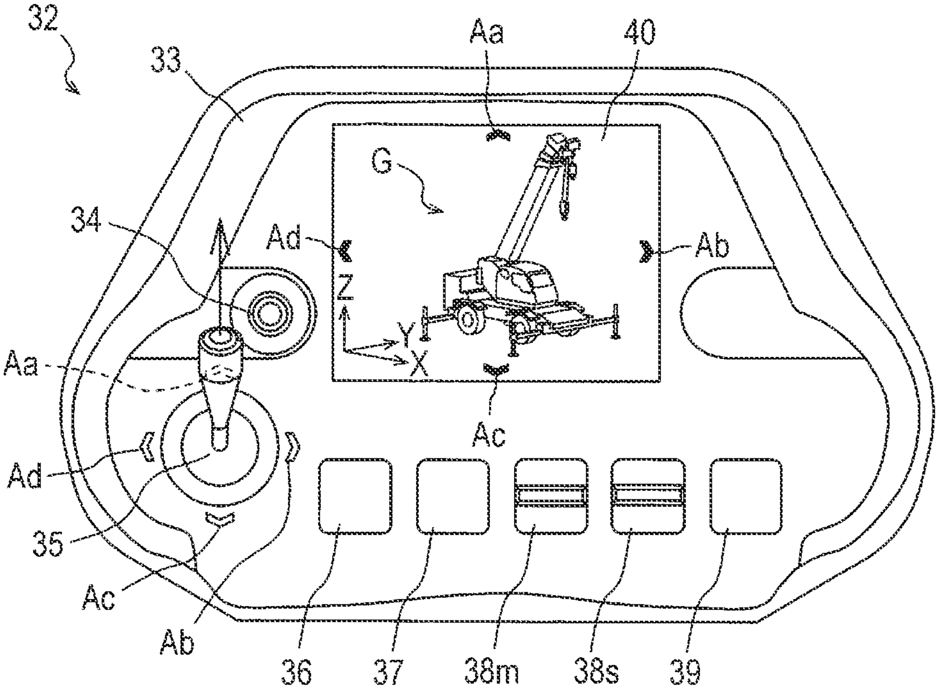
FIGS. 6(A) and 6(B) illustrate the first embodiment of the remote operation terminal.
Figure 6:
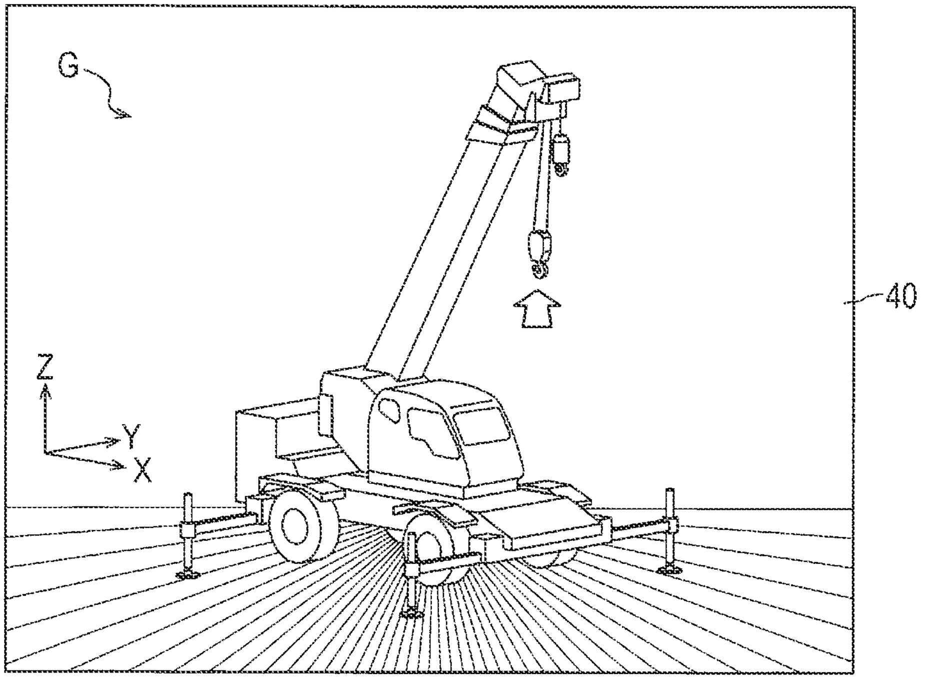

As illustrated in FIGS. 6(A) and 6(B), the terminal-side control device 43 (see FIG. 4) generates a control signal of the crane 1 on the basis of the operation signal related to the tilting direction and tilting amount acquired from the tilted suspended load moving operation tool 35, and simultaneously moves the tip of the boom 9 in the three-dimensional image G of the crane 1 in the tilting direction of the suspended load moving operation tool 35. When the suspended load moving operation tool 35 is tilted in the direction of the arrow Aa (see FIG. 6(A)), which is the upward direction of the remote operation terminal 32, the terminal-side control device 43 moves the tip of the boom 9 in the three-dimensional image G of the crane 1 displayed on the display device 40 horizontally as well as in a direction perpendicular to the operation surface of the remote operation terminal 32 in the virtual space from the display state (see FIG. 6(B)). That is, the terminal-side control device 43 moves the tip of the boom 9 in the display state of the three-dimensional image G of the crane 1 in the upward direction of the remote operation terminal 32 which is the same direction as the tilting direction of the suspended load moving operation tool 35 on the screen of the display device 40 (see white arrow). In the crane 1 in the virtual space, the tip of the boom 9 moves toward the −X-axis direction which is the backward direction as well as the Y-axis which is the left direction in the forward direction.

Hereinafter, control of the crane 1 by the remote operation terminal 32 will be described with reference to FIGS. 7 and 8. In the present embodiment, assume that the crane 1 is disposed at a position away to such an extent that the operator who operates the remote operation terminal 32 cannot visually recognize the crane 1. Assume that the crane 1 and the remote operation terminal 32 are communicable through the wide-area information communication network. As a result, the crane 1 can be operated by the remote operation terminal 32 regardless of whether it is inside or outside the country as long as the crane 1 can be connected to the wide-area information communication network. Additionally, also assume that the remote operation terminal 32 acquires attitude information of the crane 1, the movable range of the crane 1, and the current position of the tip of the boom 9 of the crane 1 from the control device 31 of the crane 1. Moreover, assume that the remote operation terminal 32 acquires three-dimensional information of the crane 1 and three-dimensional information of planimetric features and the like of the work site from a BIM included in a server or the like (not illustrated).

Figure 7:
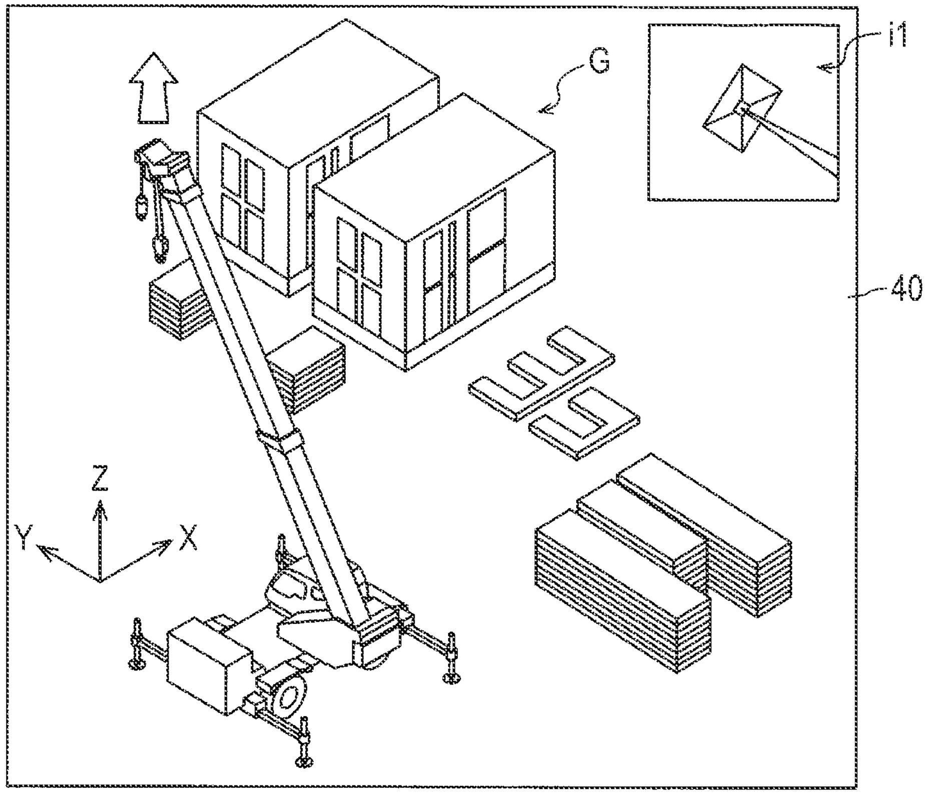
FIG. 7 is a partially enlarged view illustrating the display device when the suspended load moving operation tool is operated in a state where the three-dimensional images of the crane and planimetric features are displayed on the remote operation terminal.

As illustrated in FIG. 7, the display device 40 of the remote operation terminal 32 displays the three-dimensional image G of the crane 1 and planimetric features within a movable range of the crane 1. The three-dimensional image P displayed on the display device 40 is rotated and moved in an arbitrary viewpoint position and viewpoint direction by the viewpoint changing operation tool 34.

When the suspended load moving operation tool 35 is tilted in the direction of the arrow Aa (see arrow in FIG. 6(A)), which is the upward direction of the remote operation terminal 32, the terminal-side control device 43 (see FIG. 4) generates a control signal for moving the tip of the boom 9 horizontally as well as in a vertical direction at the time of facing the operation surface of the housing 33 in the virtual space in the display state of the three-dimensional image G of the crane 1 displayed on the display device 40. At the same time, the terminal-side control device 43 moves the tip of the boom 9 in the three-dimensional image G of the crane 1 horizontally as well as in a vertical direction at the time of facing the operation surface of the housing 33 in the virtual space (see white arrow). When the transmission operation of the generated control signal is performed, the terminal-side control device 43 transmits the control signal to the control device 31 (see FIG. 2) of the crane 1.

When the terminal-side main drum operation tool **38*m* or the terminal-side sub drum operation tool 38*s* is operated in the vertical direction of the remote operation terminal 32, the terminal-side control device 43 winds up or winds out the main wire rope 14 or the sub wire rope 16. That is, regardless of the display state or the three-dimensional image G of the crane 1 displayed on the display device 10, when the terminal-side main drum operation tool 38*m* or the terminal-side sub drum operation tool 38*s* is operated in the upward direction of the remote operation terminal 32, the terminal-side control device 43 generates a control signal so that the load W moves in a direction away from the ground. Additionally, when the terminal-side main drum operation tool 38*m* or the terminal-side sub drum operation tool 38*s* is operated in the downward direction of the remote operation terminal 32, the terminal-side control device 43** generates a control signal so that the load W moves in a direction approaching the ground.

Figure 8:
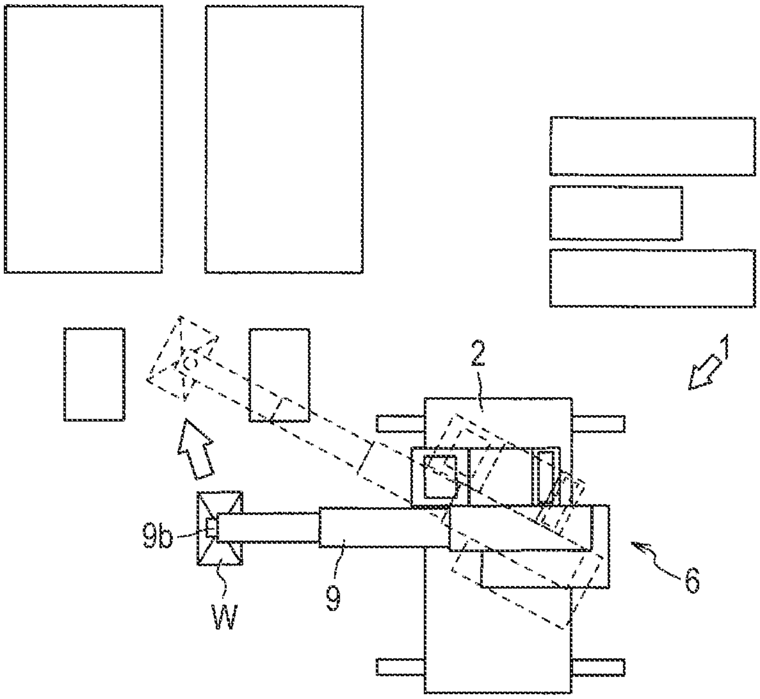
FIG. 8 is a plan view illustrating the crane controlled by the remote operation terminal operated in FIG. 7.

As illustrated in FIG. 8, the control device 31 (see FIG. 2) of the crane 1 acquires a control signal from the terminal-side control device 43 (see FIG. 4) of the remote operation terminal 32 using a wide-area information communication network or the like. The control device 31 controls each valve of each actuator on the basis of the acquired control signal. The crane 1 moves the tip of the boom 9 so as to correspond to the movement of the tip of the boom 9 in the display state of the three-dimensional image G of the crane 1 of the display device 40 illustrated in FIG. 7 (see white arrow).

With this configuration, the remote operation terminal 32 (see FIG. 4) generates the control signal so that the tip of the boom 9 in the display state of the three-dimensional image G (see FIG. 7) of the crane 1 in the virtual space displayed from an arbitrary viewpoint and line-of-sight direction moves in the tilting direction of the suspended load moving operation tool 35 (i.e., operating direction of crane operation). Hence, the remote operation of the crane 1 is intuitively performed without being conscious of the positional relationship of the viewpoint with respect to the crane 1. Additionally, since the control signal of the crane 1 is generated on the basis of the movement of the crane 1 using the three-dimensional image G in the virtual space, the crane 1 is operated consideration of the surrounding situation and operation conditions. As a result, an erroneous operation at the time of remote operation of the crane 1 can be prevented, and the remote operation of the crane 1 can be performed in an easy and simple manner.

Note that as illustrated in FIG. 7, the display device 40 of the remote operation terminal 32 may display the suspended load image i1 captured by the suspended load camera 9*b* (see FIG. 2) of the crane 1. The terminal-side control device 43 causes the display device 40 to display the suspended load image i1 acquired from the control device 31 of the crane 1 such that the suspended load image i1 is rotated by a rotation angle around the Z-axis of the three-dimensional image G of the crane 1.

With this configuration, information of a planimetric feature or the like that is not reproduced in the three-dimensional image G in the virtual space is displayed by the suspended load image i1. As a result, an erroneous operation at the time of remote operation of the mobile crane 1 can be prevented, and the remote operation of the mobile crane 1 can be performed in an easy and simple manner.

Next, a crane 1 according to the present invention and a remote operation terminal 32 as a second embodiment of the remote operation terminal of the crane 1 will be described with reference to FIGS. 9, 10(A), and 10(B). Note that the crane 1 and the remote operation terminal 32 according to the following embodiment are applied in place of the crane 1 and the remote operation terminal 32 to the crane 1 and the remote operation terminal 32 illustrated in FIGS. 1 to 8, and the names, figure numbers, and reference numerals used in the description are used to indicate the same components. In the following embodiment, points similar to those of the previously described embodiment will not be specifically described, and differences will be mainly described.

Figure 9:
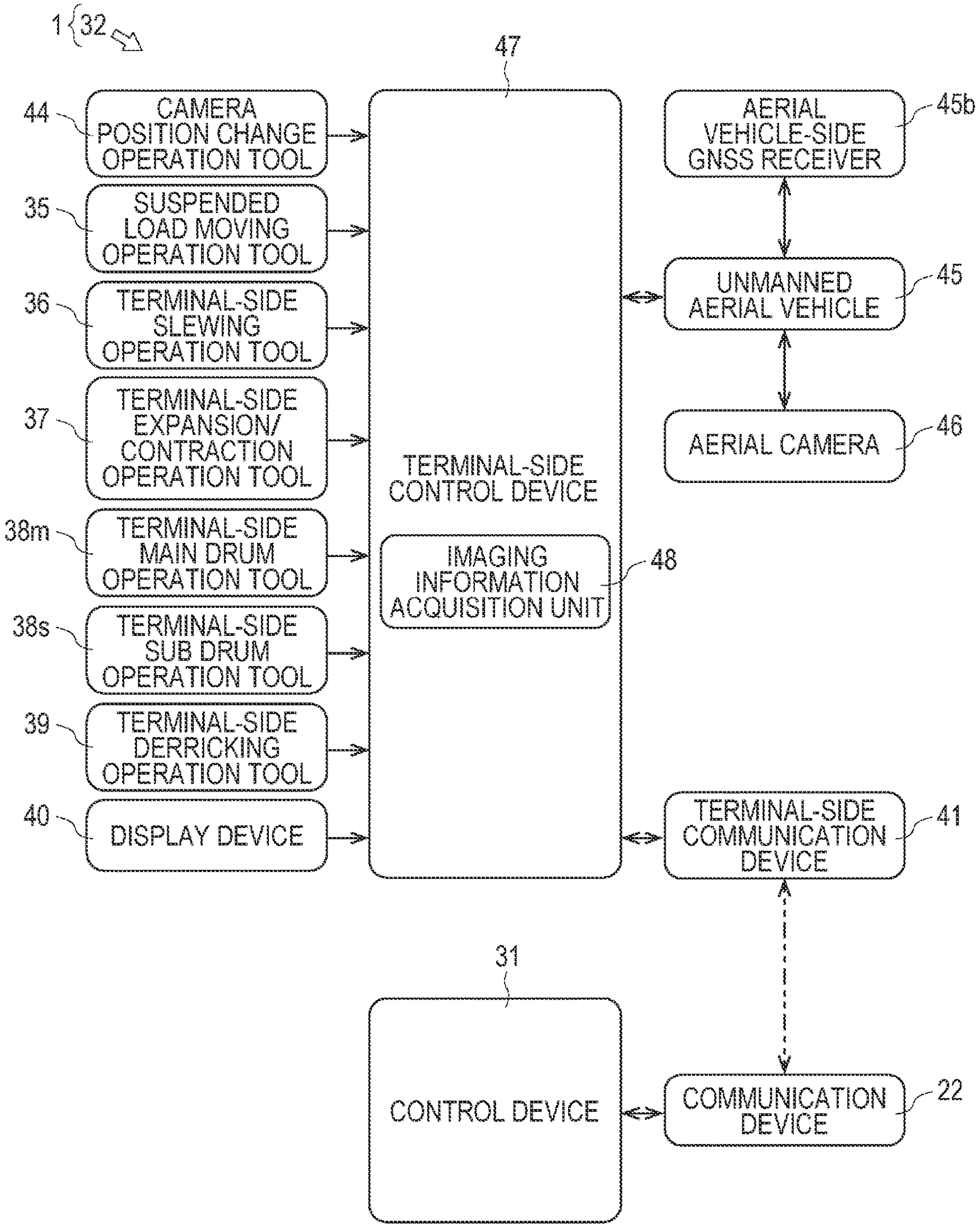
FIG. 9 is a plan view illustrating a schematic configuration of a second embodiment of the remote operation terminal.

As illustrated in FIG. 9, the remote operation terminal 32 is a device used for remotely operating the crane 1. The remote operation terminal 32 includes a housing 33, a camera position change operation tool 44 which is an aerial vehicle operation unit, a suspended load moving operation tool 35 of the housing 33, a terminal-side slewing operation tool 36, a terminal-side expansion/contraction operation tool 37, a terminal-side main drum operation tool 38*m*, a terminal-side sub drum operation tool 38*s*, a terminal-side derricking operation tool 39, a display device 40, a terminal-side communication device 41, an unmanned aerial vehicle 45, an aerial camera 46, a terminal-side control device 47, and the like.

The camera position change operation tool 44 is an operation tool that receives input of an operation of the unmanned aerial vehicle 45 capturing an image displayed on the display device 40. That is, the camera position change operation tool 44 is an operation tool that changes the position coordinates and the imaging direction of the aerial camera 46 by operating the unmanned aerial vehicle 45. The camera position change operation tool 44 includes a rotatable operation stick protruding from an operation surface of the housing 33, and a sensor (not illustrated) that detects a rotation direction and rotation amount, and a tilt direction and tilt amount of the operation stick.

With an operation of the operation stick, the camera position change operation tool 44 transmits, to the terminal-side control device 47, a signal regarding the position coordinates of the unmanned aerial vehicle 45 holding the aerial camera 46 and the direction of the camera. That is, with an operation of the operation stick, the camera position change operation tool 44 transmits, to the terminal-side control device 47, a signal regarding the camera coordinates and the displacement amount in the photographing direction of a control image i2, which is an image from the aerial camera 46 displayed on the display device 40.

The display, device 40 is a display device 40 that displays various information such as attitude information of the crane 1 and information of the load W. The display device 40 includes an image display device such as a liquid crystal screen. The display device 40 is provided on the operation surface of the housing 33. The display device 40 displays the control image i2 of the crane 1 and the ground surface, the ground object, and the like within the movable range of the crane 1 captured by the aerial camera 46.

The terminal-side communication device 41 is a device that receives control information of a crane device 6, the unmanned aerial vehicle 45, and the aerial camera 46, the control image i2 from the aerial camera 46, and the like through a wide-area information communication network or the like, and transmits the control information and the like from the remote operation terminal 32 to the crane device 6 and the unmanned aerial vehicle 45. Upon receipt of a suspended load image i1 from the crane device 6, the control image i2 from the aerial camera 46, control signals of the crane device 6 and the unmanned aerial vehicle 45, and the like, the terminal-side communication device 41 transmits the suspended load image i1, the control image i2, the control signals, and the like to the terminal-side control device 47. Additionally, the terminal-side communication device 41 transmits control information from the terminal-side control device 47 to the crane device 6 or to the unmanned aerial vehicle 45 through the communication device 22 of the crane 1 from the wide-area information communication network or the like.

The unmanned aerial vehicle 45 is a moving device that transports the aerial camera 46. The unmanned aerial vehicle 45 has a plurality of rotary blades 45*a* (see FIG. 10(A)). The unmanned aerial vehicle 45 can fly while maintaining an arbitrary attitude or stop flight (hover) by controlling the plurality of rotary blades 45*a*. The unmanned aerial vehicle 45 can move to an arbitrary position and stop by a control signal from the remote operation terminal 32. The unmanned aerial vehicle 45 is provided with an aerial vehicle-side GNSS receiver 45*b* (see FIG. 9) and the aerial camera 46. The unmanned aerial vehicle 45 can acquire position coordinates of the unmanned aerial vehicle 45 with the aerial vehicle-side GNSS receiver 45*b*. The unmanned aerial vehicle 45 can image an object from camera coordinates which are position coordinates of the unmanned aerial vehicle 45 and an imaging direction by stop flight.

The terminal-side control device 47 as a control unit is a device that controls the remote operation terminal 32. The terminal-side control device 47 includes an imaging information acquisition unit 48. The terminal-side control device 47 stores various programs and data in order to control operations of the suspended load moving operation tool 35, the terminal side slewing operation tool 36, the terminal-side expansion/contraction operation tool 37, the terminal-side main drum operation tool 38*m*, the terminal-side sub drum operation tool 38*s*, the terminal-side derricking operation tool 39, the display device 40, the terminal-side communication device 41, the camera position change operation tool 44, and the like.

The terminal-side control device 47 is connected to the terminal-side communication device 41, and can transmit and receive various types of information to and from the unmanned aerial vehicle 45 connected through a wide-area information communication network or the like. Specifically, the terminal-side control device 47 can acquire the camera coordinates, the imaging direction, and the control image i2 captured by the aerial camera 46 from the unmanned aerial vehicle 45.

The terminal-side control device 47 is connected to the display device 40, and can cause the display device 40 to display the control image 12 in which the aerial camera 46 captures the current crane 1 and surrounding planimetric features or the like from an arbitrary capturing direction at arbitrary camera coordinates.

The terminal-side control device 47 generates a control signal of the crane 1 when the suspended load moving operation tool 35 is tilted, with reference to a display state which is a position and an orientation on a screen of the control image i2 of the crane 1 displayed on the display device 40. Specifically, when the suspended load moving operation tool 35 is tilted in the vertical direction of the remote operation terminal 32, the terminal-side control device 47 generates a control signal of the crane 1 in which the tip of the boom 9 moves horizontally as well as in a direction corresponding to the vertical direction at the time of facing the operation surface of the housing 33 from the display state of the control image i2. Additionally, when the suspended load moving operation tool 35 is tilted the left-right direction of the remote operation terminal 32, the terminal-side control device 47 generates a control signal of the crane 1 in which the tip of the boom 9 moves horizontally as well as in a direction corresponding to the left-right direction at the time of facing the operation surface of the housing 33 from the display state of the control image i2. That is, the terminal-side control device 47 generates a control signal in which the tip of the boom 9 in the display state of the control image i2 of the crane 1 moves in a direction corresponding to the same direction as the tilting direction of the suspended load moving operation tool 35 on the screen of the display device 40.

Figure 10:
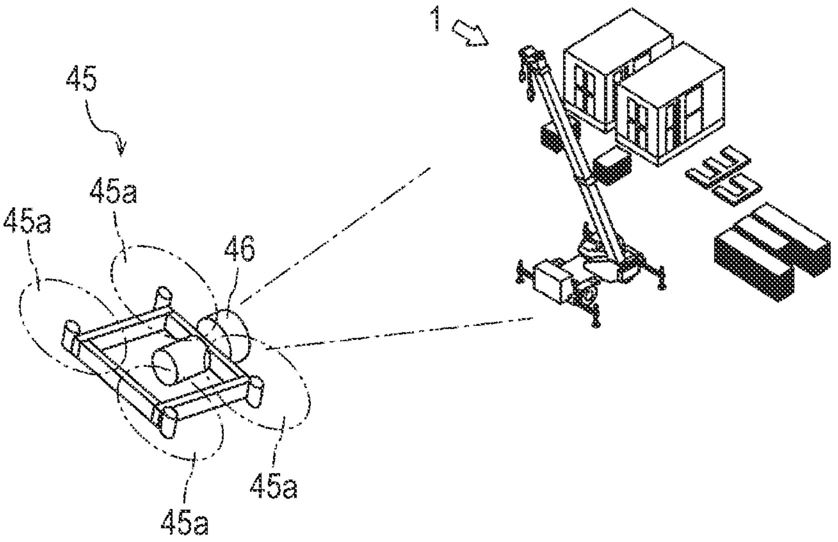
FIGS. 10(A) and 10(B) illustrate the second embodiment of the remote operation terminal.
Figure 10:
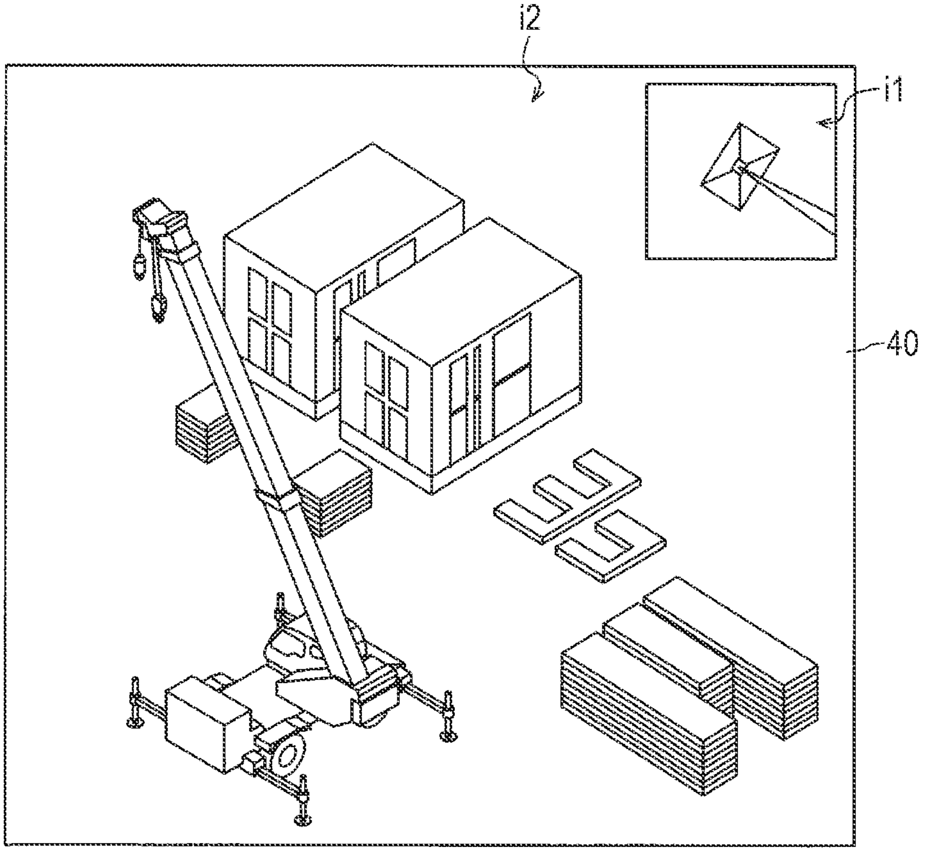

As illustrated in FIG. 10(A), the unmanned aerial vehicle 45 performs stop flight at an arbitrary positron by a control signal from the remote operation terminal 32. The unmanned aerial vehicle 45 transmits the position coordinates and the attitude during the stop flight to the remote operation terminal 32 as camera coordinates and an imaging direction. At the same time, the unmanned aerial vehicle 45 transmits the control image i2 captured by the aerial camera 46 to the remote operation terminal 32.

As illustrated in FIG. 10(B), the control image i2 captured by the aerial camera 46 is displayed on the display device 40 of the remote operation terminal 32. The control image i2 displayed on the display device 40 is captured from an arbitrary capturing direction at arbitrary camera coordinates by the camera position change operation tool 44. The terminal-side control device 47 of the remote operation terminal 32 generates a control signal for moving the tip of the boom 9 of the crane 1 in a direction corresponding to the tilting direction of the suspended load moving operation tool 35 on the screen of the display device 40.

With this configuration, the terminal-side control device 47 of the remote operation terminal 32 generates the control signal so that the tip of the boom 9 of the crane 1 displayed on the display device 40 moves in the direction corresponding to the tilting direction of the suspended load moving operation tool 35 in the display state. Hence, the remote operation of the crane 1 is intuitively performed without being conscious of the positional relationship between the camera coordinates of the aerial camera 46, which is the viewpoint for the crane 1, and the imaging direction. As a result, an erroneous operation at the time of remote operation of the crane 1 can be prevented, and the remote operation of the crane 1 can be performed is an easy and simple manner.

In the present embodiment, the remote operation terminal 32 acquires the control image i2 from the aerial camera 46 of one unmanned aerial vehicle 45. However, the remote operation terminal 32 may acquire the control image i2 from the aerial camera 46 of each of a plurality of unmanned aerial vehicles 45. The remote operation terminal 32 can arbitrarily switch among a plurality of control images i2 captured from different capturing directions at different camera coordinates and use the control images i2 for controlling the crane 1. With this configuration, it is not necessary to move the unmanned aerial vehicle 45 each time, so that the remote operation of the crane 1 can be performed in an easy and simple manner. Additionally, instead of the aerial camera 46 included in the unmanned aerial vehicle 45, an image from a ground surface camera installed at an arbitrary position may be used.

The above-described embodiments are merely representative forms, and various modifications can be made without departing from the gist of one embodiment. It is a matter of course that the present invention can be implemented in various other forms. The scope of the present invention is indicated by the description of the claims, and further includes equivalents of the description of the claims and all modifications within the scope.

REFERENCE SIGNS LIST

1 crane
6 crane device
9 boom
30 GNSS receiver
31 control device
32 remote operation terminal
34 viewpoint changing operation tool
35 suspended load moving operation tool
40 display device
41 terminal-side communication device
43 terminal-side control device
44 camera position change operation tool
45 unmanned aerial vehicle
46 aerial camera
47 terminal-side control device

The invention claimed is:

1. A remote operation terminal of a mobile crane including a position detection unit that detects a current position of a tip of a boom, the mobile crane being a vehicle mounting a crane device having the boom, the remote operation terminal comprising:

a three-dimensional information acquisition unit that acquires three-dimensional information of each of the mobile crane and a planimetric feature within a movable range of the mobile crane;

a display unit that displays, in a virtual space, a three-dimensional image of each of the mobile crane and the planimetric feature within the movable range of the mobile crane;

a crane operation unit that receives a crane operation done by an operator and remotely operates the mobile crane so as to correspond to the crane operation;

an image operation unit that receives an image display changing operation done by the operator and controls a viewpoint position and a viewpoint direction in the three-dimensional image displayed on the display unit so as to correspond to the image display changing operation; and a control unit that is configured to be communicable with a control device of the mobile crane and controls each unit of the remote operation terminal, wherein the control unit acquires attitude information of the mobile crane, movable range information of the mobile crane, and current position information of the tip of the boom from the control device of the mobile crane, generates the three-dimensional image of the current mobile crane and the three-dimensional image of the planimetric feature within the movable range of the current mobile crane, on the basis of the information acquired from the control device of the mobile crane and the three-dimensional information acquired by the three-dimensional information acquisition unit, displays the generated three-dimensional image in the virtual space of the display unit at the viewpoint position and the viewpoint direction input to the image operation unit, and when the crane operation is input to the crane operation unit, associates a coordinate system of a horizontal plane of the three-dimensional image displayed on the display unit with an operation direction of the crane operation on the basis of the viewpoint position and the viewpoint direction, and generates a control signal for remotely operating the mobile crane so that the tip of the boom displayed on the display unit moves horizontally toward the operation direction of the crane operation, and wherein, by the crane operation, the tip of the boom of the actual mobile crane is moved so as to correspond to the movement of the tip of the boom of the mobile crane displayed on the display unit.

2. The remote operation terminal according to claim 1, wherein the crane operation unit is configured to be capable of operating the three-dimensional image of the mobile crane displayed on the display unit, and the control unit generates a control signal for remotely operating the mobile crane on the basis of operation information of the three-dimensional image by the crane operation unit.

3. The remote operation terminal according to claim 1, wherein the control unit acquires an image captured by a suspended load camera included in the mobile crane, and causes the display unit to display the acquired image together with the three-dimensional image.

4. A mobile crane comprising the remote operation terminal according to claim 1, wherein a boom is operated on the basis of the control signal received from the remote operation terminal.

5. The remote operation terminal according to claim 1, wherein the crane operation unit is configured by a first operation stick provided on a housing of the remote control terminal, and the image operation unit is configured by a second operation stick provided on the housing of the remote control terminal.

6. The remote operation terminal according to claim 1, wherein a moving direction of the tip of the boom of the actual mobile crane by the crane operation in a first operation direction performed when the viewpoint position and the viewpoint direction respectively correspond to a first position and a first direction is different from the moving direction of the tip of the boom of the actual mobile crane by the crane operation in the first operation direction performed when the viewpoint position and the viewpoint direction respectively correspond to a second position and a second direction.

7. A remote operation terminal of a mobile crane including a position detection unit that detects a current position of a tip of a boom, the mobile crane being a vehicle mounting a crane device having the boom, the remote operation terminal comprising:

an aerial camera that images the mobile crane and a planimetric feature within a movable range of the mobile crane, the aerial camera being mounted on an unmanned aerial vehicle;

an aerial vehicle operation unit that operates the unmanned aerial vehicle;

an imaging information acquisition unit that acquires an image captured by the aerial camera, and position coordinates and a capturing direction of the aerial camera;

a display unit that displays the image;

a crane operation unit that receives a crane operation done by an operator and remotely operates the mobile crane so as to correspond to the crane operation; and a control unit that is configured to be communicable with a control device of the mobile crane and controls each unit of the remote operation terminal, wherein the control unit acquires attitude information of the mobile crane and current position information of the tip of the boom of the mobile crane from the control device of the mobile crane, displays the image acquired by the imaging information acquisition unit on the display unit, and when the crane operation is input to the crane operation unit, associates a coordinate system of a horizontal plane of the image displayed on the display unit with an operation direction of the crane operation on the basis of the position coordinates and the capturing direction of the aerial camera, and generates a control signal for remotely operating the mobile crane so that the tip of the boom displayed on the display unit moves horizontally toward the operation direction of the crane operation, and wherein, by the crane operation, the tip of the boom of the actual mobile crane is moved so as to correspond to the movement of the tip of the boom of the mobile crane displayed on the display unit.

8. The remote operation terminal according to claim 7, wherein the imaging information acquisition unit acquires position coordinates of the unmanned aerial vehicle and a direction of the aerial camera as position coordinates and an imaging direction of the aerial camera, and the display unit displays the image captured by the aerial camera of the unmanned aerial vehicle operated by the aerial vehicle operation unit.

* * * * *